Patented Nov. 17, 1942

2,302,310

UNITED STATES PATENT OFFICE 2,302,310

STABILIZED PARTIALLY HYDROLYZED STARCH PASTES

Sivert N. Glarum, Ardmore, Pa., and Joseph J. Thomas, Springfield, Mass., assignors to Röhm & Haas Company, Philadelphia, Pa.

No Drawing. Application October 19, 1939, Serial No. 300,173

11 Claims. (Cl. 260—9)

This invention relates to homogeneous, modified-starch pastes prepared by hydrolysis of starch in a wet way and stabilized with a water-soluble carbamide-aldehyde reaction product, and to the process of making such pastes.

In the application of starch for coating or sizing of yarn, fabrics, paper, or other materials it is necessary to treat the raw starch in order to obtain a material which will give a satisfactory deposition possessing the proper degree of such properties as penetration, adhesion, cohesion, plasticity, solubility, body, or other characteristic. It has been the practise to boil starches to produce viscous pastes or to treat starch chemically to obtain thin-boiling pastes of improved penetration. Hydrolysis of starches with the aid of an acidic substance or an enzyme produces pastes which have many highly desirable properties and by proper control of the process of hydrolysis it is possible to emphasize one set of properties in preference to another.

The pastes which are prepared by such wet processes contain varying amounts of soluble starches, dextrines and sugars, although the last-named products are generally present in definitely limited amount. Extent of hydrolysis is controlled not by chemical composition, however, but by viscosity, body, solubility, or other characteristic, considered alone or in combination. It is not always easy to prepare pastes which have the desired solubility and body along with proper solids content, but even when this is accomplished the pastes generally lack stability. They tend to gel and otherwise change on standing so that they are no longer useful for their intended purpose. If no preservative such as formaldehyde is added, they also tend to mold or decay on ageing.

Conversion of starch in a dry way in the presence of acids, alkalies, urea, oxidizing agents, etc. produces products which are quite soluble and which are useful in certain applications, but in general these products are more expensive, less desirable, and less suited for the usual uses which are made of hydrolyzed starch pastes.

It is an object of this invention to provide a method for stabilizing partially hydrolyzed starch pastes. It is an object to render such pastes highly resistant to spoilage by molds or bacteria. It is an object to preserve starch pastes which have been partially liquefied by enzymatic action so that a smooth, homogeneous, stable product is obtained. It is an object to increase the utility of amylase-hydrolyzed starch pastes by reaction of the pastes with a water-soluble carbamide-aldehyde addition or condensation product, particularly by the use of methylol or dimethylol urea. It is a further object to stabilize pastes made by the partial hydrolysis of starch in a wet way, whether converted by the action of enzymes or by the action of chemicals, such as acids or alum.

It has been found that the partially hydrolyzed pastes obtainable from starch in wet processes may be stabilized by heating the hydrolyzed products in paste form with a water-soluble carbamide-aldehyde reaction product. In general a paste of the desired degree of hydrolysis is first prepared and then heated with the carbamide-aldehyde reaction product. The paste then remains fluid, but viscous, homogeneous, stable against changes in these properties and free from decay.

For the preparation of these pastes there may be used raw starch in a pure or a crude form obtained from such sources as wheat, rye, corn, potato, sago, cassava, etc. The starch is usually prepared in a powdered form and is readily taken up with water to form a milk or paste or, if it is in the form of lumps or granules, it is mechanically worked with water until a slurry results. If enzymes are to be used for conversion, the starch slurry or suspension is heated until the gelatinization point is reached. The temperature required for this varies with different starches and in general falls between 60 and 85° C. If acid is used for the hydrolysis, the slurry may be similarly first heated but this is not essential as the acid hydrolysis may start with the ungelatinized slurry.

Hydrolysis with the aid of enzymes produces particularly desirable pastes which may be unusually well controlled in their properties. The amylase used may be obtained through the medium of fungi, glands, bacteria, or malt. Comparable results are obtained with enzymes from these different sources, although certain secondary differences in the resulting products are often of importance.

In general, the procedure which is followed in hydrolyzing starch with enzymes is, as stated above, first to gelatinize the starch and then to allow the enzymes to react with the gelatinized starch until the desired degree of body, viscosity, solubility, etc. is reached. If heat-resistant enzymes are used, they may be mixed with the slurry or milk of raw starch. When the temperature has been raised until gelatinization occurs, the enzymes then begin to act at once. Alternatively, the enzymes may be added after the starch has been gelatinized. This latter procedure is particularly advisable when temperature-sensitive enzymes are employed. In this case the gelatinized paste may be cooled to about 60° C. or less and an amylase, such as one from a pancreatic source, added. Agitation is helpful in promoting the hydrolysis. When the desided properties have been obtained in the paste, the enzymes are deactivated, preferably by increasing the temperature. While pancreatic enzymes on the one hand are deactivated at temperatures as low as 70–80° C., temperatures up to 100° C. may be necessary for the deactivation for enzymes of bacterial origin or from malt.

The time required for enzyme treatment depends upon the particular enzyme preparation used, the temperature of conversion, the ratio of enzyme to starch, the pH of the paste during conversion, the degree of hydrolysis desired, etc. It should be noted that some variation in the final products also results from the choice of enzymes. With the usual commercial preparation of enzymes used at the ratio of 0.25 to 3 parts per 100 parts of starch, the conversion periods vary from about five minutes to several hours. Lower or higher ratios of enzymes and starch may be used if proper allowance is made for the change in this ratio. In enzyme hydrolysis the pH is of particular importance and it is advisable to adjust the pH when necessary to the region of optimum activity for the particular enzyme used. In general, a pH close to the neutral point is desired. The usual enzyme from fungus, for example, is most effective at a pH of just below 7 and when the starch slurry is below 5.8 or above 7.2 a small amount of alkali, acid, or a neutral buffer may be added, to establish the best conditions.

When increased fluidity or more rapid conversion is required, a larger amount of enzyme may be used, or a longer period of hydrolysis. When a lower degree of hydrolysis is desired, less of the enzyme preparation or a shorter time, or both, will accomplish the desired end. Lower temperatures give less rapid conversion. At higher temperatures the rate of inactivation of the enzyme is greater but the rate of hydrolysis is increased. At the higher temperatures the hydrolysis produces primarily soluble starches and dextrines with a minimum of sugars—a preferred condition. It is thus possible to control conditions to yield practically any type of enzyme-converted starch paste desired.

The sensitivity of enzymes to pH allows their inactivation by means other than heat. In particular, the hot paste may be acidified or treated with a coagulating chemical such as alum. Strong acids, however, can be used only with great care and with subsequent neutralization. Organic acids, such as acetic acid, and salts, such as alum, zinc sulfate, etc., are to be preferred if chemical deactivation is used.

The hydrolysis of starch in the presence of acid may likewise be controlled to yield modified-starch pastes useful for the sizing of yarns and fabrics, the coating of fibrous sheets, or the binding of paper or other materials together. The hydrolysis with acid bears a close resemblance to the procedure with enzymes, but must be more critically controlled and requires acid-resisting apparatus. There may be used any strong, organic or inorganic acid, such as hydrochloric, nitric, sulfuric, oxalic, acetic, etc., or mixtures of such acids. The hydrolysis is controlled by temperature, concentrations, and time of reaction as is known in the art and as illustrated, for example, in U. S. Patents 579,827; 642,329, 642,330; 642,331; 675,822 or 742,469. When the desired stage of hydrolysis is reached, the acid is deactivated by neutralization. The acids may split "hulls" and esters which are usually unaltered by enzymes. As with the enzyme-hydrolysis, the product desired is a mixture of gelatinized and soluble starches, dextrines, and sugars. The more desirable pastes possessing proper viscosity, adherence, and tackiness contain a minimum of sugars. The concentration of raw starch used in preparing pastes may vary widely. In general, pastes may be prepared from 2 to 60% starch. Even higher solids contents have been obtained by the gradual addition of starch during the process of hydrolysis. Pastes containing low percentages of solids are useful in sizing, stiffening, and finishing fabrics. Pastes made with 2 to 15% starch are suitable for an application such as the tub-sizing of paper. Pastes made from higher concentrations of starch are particularly suitable for beater-sizing or as adhesives for gummed or coated paper, adhesives for envelopes, adhesives for laminating paper to paper or paper to cloth, etc.

The carbamide-aldehyde reaction products which are useful in this invention are the water-soluble addition or condensation products obtained by reacting urea, thiourea, dicyandiamide, a triazine such as melamine, or other carbamide-type material, alone or in mixtures thereof, with an aldehyde, particularly formaldehyde. The preferred material is urea-formaldehyde in the form of a methylol urea. The carbamide-aldehyde product is usually added after the starch has been carried to the desired degree of hydrolysis. It may also be added to the original slurry, when enzymes are used.

After the desired stage of hydrolysis is reached, the mixture containing the carbamide-aldehyde product is heated for five to thirty minutes at 80° C. or higher. If the carbamide-aldehyde product is merely mixed in without heating, stabilization of the paste does not result. During the heating there is definite interaction between the carbamide-aldehyde product and the hydrolyzed starch products, the effects being both chemical and physical. Usually the pastes become clearer. The more concentrated pastes, which normally exhibit plastic flow, are converted to pastes exhibiting viscous flow.

As small an amount of dimethylol urea as one-half per cent., based on the weight of starch, has a distinct, beneficial effect on homogeneity and stability of the modified starch pastes. Thus, in a paste containing 20% starch dimethylol urea is needed to the extent of only 0.1% of the total paste to have a distinct stabilizing effect. While there is no sharp upper limit to the amount of carbamide-aldehyde reaction product which may be used, amounts greater than about one part of said reaction product to four parts of starch require a careful pH control if stable liquid pastes are to be obtained. Under the conditions of reaction herein described wherein hydrogen ion control is unessential a practical upper limit of one part of reaction product to four parts of starch must be observed. The utilization of higher ratios of reaction product to starch under controlled pH conditions is being made the subject matter of a separate application, Serial No. 300,172, filed Oct. 19, 1939.

The following examples illustrate the invention:

Example 1

A 20% starch slurry was prepared by taking up 20 parts of tapioca starch in 80 parts of water and adding one-fifth part of a commercial diastase from fungus. The slurry was heated with steam while being stirred mechanically, until a temperature of 70° C. was reached. This temperature was maintained for 30 minutes. The paste thus produced was divided into seven batches. The first batch was heated to 95° C. for 15 minutes. To the second batch was added 0.2% of a dimethylol urea powder, which was stirred in well and dissolved. This batch was then heated to 95° C. for 15 minutes. A third batch was treated with 2% of dimethylol urea and the fourth batch with 5% of dimethylol urea and both batches also heated to 95° C. for 15 minutes. The fifth, sixth, and seventh batches were heated to 95° C. to inactivate the enzymes, then cooled, and 0.2%, 2%, and 5% of dimethylol urea mixed in the respective batches.

The batches were examined at the end of 2, 11, and 31 days. Batch No. 1 (untreated) had gelled in 2 days, separated in 11 days, and decayed in 31 days. Batch No. 2 had thickened slightly in 2 days but was unchanged in 11 days and still entirely satisfactory for use after the lapse of 31 days. Batch No. 3 was thick and fluid throughout the test. Batch No. 4 was likewise thick, fluid, and stable throughout the test. On the other hand, Batch No. 5 was lumpy within 2 days and moldy in 11 days. Batch No. 6 was thickened beyond usefulness in 11 days. Batch No. 7 first became very thick and then became watery before 11 days had passed.

Example 2

A 20% slurry of tapioca starch was prepared, heated to 70° C., cooled for a short time, and 0.5% of a commercial pancreatic disastase stirred in. When the conversion had proceeded for twenty minutes, 5% of methylol urea was added and the temperature raised to 85° C. for ten minutes. The paste was cooled and then mixed with 5 parts of titanium dioxide for each 100 parts of the paste and used for printing cotton cloth. A control sample was retained for nine months and was still suitable for use at the end of this extended period.

Example 3

A commercial product prepared from a mixture of corn and tapioca starches by mild acid hydrolysis was made into a thick paste of 10% of solids by the addition of water. Two parts of a water-soluble, powdered urea-formaldehyde reaction product were added to the paste which was then heated to about 90° C. with thorough stirring. The resulting paste was highly viscous, but mobile, and was stable over a long period of time.

Example 4

In a 1,000-gallon starch kettle equipped with an agitator and a live steam jet 1,600 lbs. of raw cornstarch was mixed with 800 gallons of cold water and 16 lbs. of a commercial fungus diastase added. The mixture was stirred for five minutes and the steam turned on until a temperature of 160° F. was reached. At this temperature the starch thickened and gelatinized, but in a few minutes the paste "melted," due to the solubilizing action of the enzyme preparation. The paste was stirred thirty minutes without any heating. The steam was then turned on again until 185° F. was reached and this temperature was maintained for five minutes. A concentrated aqueous solution of a urea-formaldehyde condensate was then stirred in while this temperature was maintained, until 80 lbs. of the condensate had been added. The resulting paste was viscous and smooth and did not show the separation which is frequently encountered with enzyme-converted cornstarch.

The starch paste was used for the tub-sizing of paper.

Example 5

40% starch paste was prepared from corn and tapioca starch and hydrolyzed with a diastase of fungus origin as in the previous examples. Before inactivation 2% of dimethylol urea was added. The viscous, heavy paste that resulted was used for laminating sheets of paper in making boxes.

Example 6

In a starch kettle equipped with live steam and agitator 1000 lbs. of water, 1000 lbs. of tapioca starch, and 10 lbs. of a commercial fungus diastase were mixed. The temperature was raised to 142° F. where the mixture gelled. The steam was shut off for five minutes during which time the gel thinned out considerably. The temperature was raised to 160° F. and held at this point for 30 minutes. The mixture was then heated to 185° F. to inactivate the diastase. 200 lbs. of dimethylol urea was then added and dissolved thoroughly in the hot paste. The entire adhesive mix was then allowed to cool slowly, resulting in a stable, smooth, semi-solid paste which was used to laminate paper to paper and cloth to paper. The resulting laminated compositions had excellent water-resistance.

If desired, a catalyst, such as ammonium thiocyanate, chloride or phosphate, formic or acetic acid, etc., may be added to the pastes just prior to the application. The catalysts promote hardening of the carbamide-aldehyde products and increase water-resistance further.

The converted starch stabilized with urea-formaldehyde as in the foregoing examples may, if desired, be bodied with borax. Starch pastes treated with borax alone are too stringy or too long for most purposes. But a paste treated with 1 to 10% of a urea-formaldehyde and then treated with a few per cent. of borax is stable, possesses good tack and viscosity, and spreads well, being thus suitable as an envelope or box gum. It is, of course, possible if desired to modify starch pastes with gums and thickeners without destroying the stability of the pastes.

Pastes prepared as shown above are homogeneous and stable over a long period of time whereas the usual hydrolyzed pastes separate, become lumpy, stiff, and cracked, or otherwise undesirable within a few days. The method of stabilization herein described permits the preparation of pastes which are ready for use and which may be stored and shipped. They can be prepared with a viscosity and solids content suitable for any application where a dressing, sizing, stiffening, finishing, coating, or binding material is necessary. It thus becomes possible to prepare the widest variety of modified-starch pastes from a few basic types of starch with only a moderate degree of control.

In paper manufacture the stabilized pastes may be used in beater- or tub-sizing for coating or laminating paper, etc. In laundry work they may replace the usual boiled starch to give smoother, more supple, yet amply stiff finishes. In textile manufacture the stabilized pastes may be used for sizing warp or fabric, along with fillers, such as clays, and with or without softeners, such as tallow or soft resins, for backfilling and stiffening for special finishes, as in denims, glazes, embossed fabrics, etc. The pastes, particularly those of high solids content, are useful as adhesives for gummed paper, envelopes, coatings, etc. and become quite water-resistant when dried, particularly under the influence of a catalyst and/or heat. The stabilized pastes, particularly those with the higher ratios of urea-formaldehyde to starch products, are useful binding agents for aqueous base printing pastes.

We claim:

1. A method of preparing stable, modified-starch pastes which comprises partially hydrolyzing starch in a wet way to form a paste and heating the paste with a water-soluble carbamide-aldehyde condensate in the proportion of not more than one part of said condensate for each four parts of starch used for the paste.

2. A method of preparing stable, modified-starch pastes which comprises partially hydrolyzing starch in a wet way to form a paste and heating said paste with a water-soluble urea-formaldehyde condensate in the proportion of not more than one part of said condensate for each four parts of starch used for the paste.

3. The method of claim 2 in which the urea-formaldehyde condensate is dimethylol urea.

4. A method of preparing a stable, modified-starch paste which comprises swelling starch with heat and water, acting upon the swelled starch with a diastatic enzyme until a desired degree of fluidity is reached, inactivating the enzyme and heating at least four parts of the partially hydrolyzed starch in paste form with one part of a water-soluble carbamide-aldehyde reaction product.

5. A method of preparing a stable, modified-starch paste which comprises swelling starch with heat and water, acting upon the swelled starch with a diastatic enzyme until a desired degree of fluidity is reached, inactivating the enzyme and heating at least four parts of the partially hydrolyzed starch in paste form with one part of a water-soluble urea-formaldehyde reaction product.

6. The method of preparing a stable, modified starch paste which comprises swelling starch with heat and water, acting upon the swelled starch with a diastatic enzyme until a desired degree of fluidity is reached, inactivating the enzyme, and heating at least four parts of the partially hydrolyzed starch in paste form with one part of dimethylol urea.

7. The product obtained by the method of claim 1.

8. The product obtained by the method of claim 2.

9. The product obtained by the method of claim 4.

10. The product obtained by the method of claim 5.

11. The product obtained by the method of claim 6.

SIVERT N. GLARUM.
JOSEPH J. THOMAS.